Figure 1:
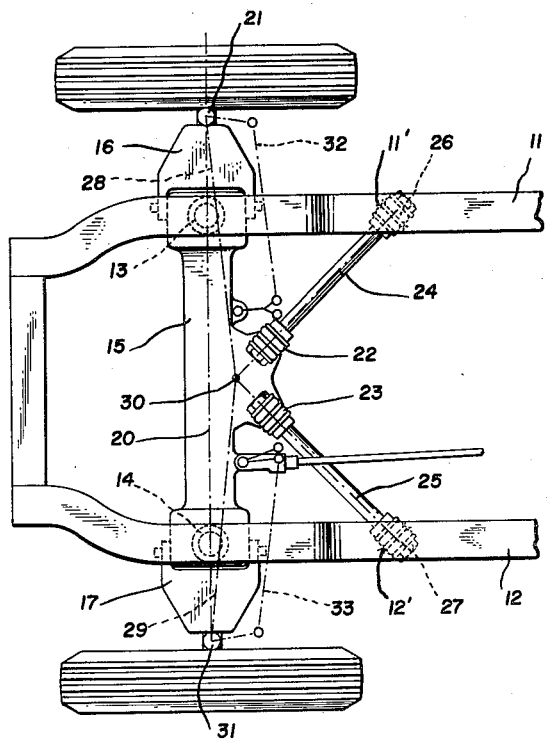

June 11, 1963   J. MÜLLER   3,093,390
AUXILIARY FRAME FOR MOTOR VEHICLES
Filed Aug. 10, 1959

INVENTOR.
JOSEF MÜLLER
BY
Dicke, Craig and Freudenberg
ATTORNEYS

United States Patent Office 3,093,390
Patented June 11, 1963

3,093,390
AUXILIARY FRAME FOR MOTOR VEHICLES
Josef Müller, Stuttgart-Riedenberg, Germany, assignor to Daimler-Benz Aktiengesellschaft, Stuttgart-Unterturkheim, Germany
Filed Aug. 10, 1959, Ser. No. 832,679
Claims priority, application Germany Aug. 16, 1958
8 Claims. (Cl. 280—106.5)

The present invention relates to a front wheel suspension for motor vehicles in which the main frame or vehicle body, for example, of a self-supporting type body, is elastically supported only at two places, namely at one place on each side of the vehicle longitudinal center plane and on an auxiliary frame carrying the wheel suspension and wheel spring system. The auxiliary frame is additionally supported, preferably elastically at the vehicle main frame or body by means of one or several members, especially by means of two separate support members symmetrically arranged with respect to the vehicle longitudinal center plane which extends essentially horizontally at a distance effective as a lever arm from the straight line passing through the two supports of the main frame on the auxiliary frame as disclosed, for example, in my co-pending application Serial No. 691,445, entitled "Front Wheel Suspension for Motor Vehicles," filed October 21, 1957, now Patent No. 3,024,040.

In accordance with one practical embodiment realizing the basic concept mentioned hereinabove, it has already been proposed to provide two horizontally disposed support members in the form of tie or pull rods arranged on both sides of the vehicle and extending parallel to each other, the forward ends of which are pivotally secured laterally above the support places of the main frame on the housings of the upper spring abutments. In connection with such a construction, difficulties, however, occur, namely, to accommodate the tie- or pull rods spatially within the engine compartment and thereby to attain the necessary vertical distance, i.e., height, between the bearing supports of the main frame on the auxiliary frame, on the one hand, and the still higher pivotal points of the forward ends of the support members, on the other, which constitutes a lever arm effective to brace or absorb the moment occurring during braking. Furthermore, the tie or pull rods extending parallel to each other in the longitudinal direction of the vehicle are hardly in a position to effectively absorb the transverse movements of the auxiliary frame.

According to a further improvement of the basic concept described in the aforementioned copending application, it is proposed in accordance with the present invention to brace the auxiliary frame with respect to the main frame by means of two support members which form the two sides of an equilateral triangle and of which one end, for example, the forward end, is pivotally secured in the center of the auxiliary frame whereas the other end, for example, the rear end, is pivotally secured at the vehicle superstructure, especially at the two longitudinal bearer members of the vehicle.

It is further proposed in accordance with another feature of the present invention, especially in combination with an auxiliary frame bent upwardly at the two outer ends thereof and elastically supported or connected thereat with the longitudinal side bearer members, to arrange the support members essentially horizontally and in the plane of the main frame or the floor members of the vehicle superstructure. The rear ends of the support members are thereby pivotally secured in accordance with the present invention within the region of the upwardly directed bent portions of the two longitudinal bearer members provided with upwardly extending off-set portions.

By the use of an arrangement in accordance with the present invention, there is achieved a large distance in the vertical direction, i.e., in the height or vertical spacing between the upper bearing or support places of the main frame on the auxiliary frame, on the one hand, and the relatively lower pivotal connection of the special support members, on the other, which reduces the proportion of the force of the occurring moment. Furthermore, a part of the transverse forces are also absorbed by the special support members extending at an incline to the auxiliary frame and therewith the bearings or supports disposed between the main frame and the auxiliary frame are relieved effectively. The support members arranged within the plane of the main longitudinal bearer members of the frame or of the floor members thereof guide the forces coming from the auxiliary frame directly into the main frame without producing moments which would load the main frame essentially in bending stresses.

If, in accordance with the present invention, the position of the intersection of the longitudinal axes of the two support members which forms theoretically the common pivot point of the two support members is so chosen that the same is disposed below and behind the straight line extending through the two bearing or support places of the main frame on the auxiliary frame and therewith the connecting lines between the aforementioned point of intersection and the pivot axes such as axle spindles of the wheels extend parallel to the outer tie rods of the steering linkage, then the aforementioned connecting lines and the outer tie rods move parallel to each other during movements of the auxiliary frame with respect to the main frame whereby the steering kinematics remain practically undisturbed during such relative movements.

Accordingly, it is an object of the present invention to provide a wheel suspension for an arrangement of a two-point support of the vehicle superstructure on the auxiliary frame of the type mentioned hereinabove which is effective to absorb essentially all the forces and moments that may occur therein.

It is another object of the present invention to provide a wheel suspension of the type having an auxiliary frame on which the wheels are suspended and which, in turn, is supported at the main frame at only two points which includes additional, special support means to absorb effectively all the forces inclusive of transverse forces directed against the auxiliary frame and which may be readily accommodated within the space available within the engine compartment without impairing the space necessary for the accommodation of the driving engine and accessories therefor.

Another object of the present invention is the provision of special support means for an auxiliary frame supporting thereon the wheel suspension which itself is elastically supported at the main frame at only two bearing places whereby the support means is operative to effectively relieve the main bearing supports between the main frame and auxiliary frame.

A still further object of the present invention is the provision of support means for use with a wheel suspension including an auxiliary frame supported elastically at a main frame which relieves the main frame of any forces or loads that would become effective thereon as bending stresses.

Another object of the present invention is the provision of a support arrangement for additionally supporting the auxiliary frame mounted elastically at the main frame at only two places which affords a relatively wide support base for the auxiliary frame.

Figure 2:
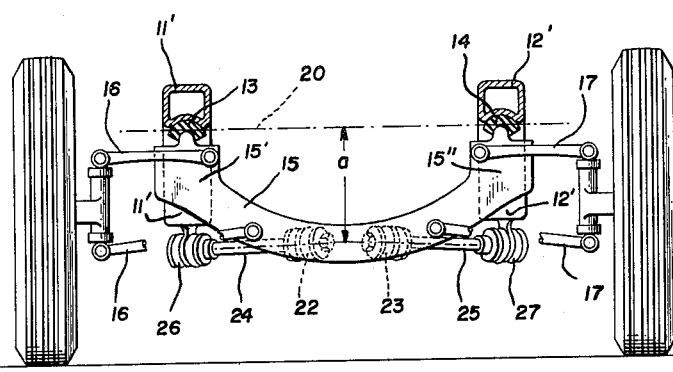

These and other objects, features and advantages of the present invention will become more obvious from the following description when taken in connection with the accompanying drawing, which shows, for purposes of illustration only, two embodiments in accordance with the present invention, and wherein:

FIGURE 1 is a top plan view of a support in accordance with the present invention of the auxiliary frame with respect to the main frame by means of special support members forming two sides of a triangle; and FIGURE 2 is a front elevational view of the arrangement of FIGURE 1.

Referring now to the drawing wherein like reference numerals are used throughout the various views to designate like parts, and more particularly to FIGURES 1 and 2 thereof, the two longitudinal side bearer members 11 and 12 of the main frame are elastically supported by means of two elastic bearing supports 13 and 14 on the auxiliary frame 15, the outer portions 15' and 15" of which are bent upwardly. The auxiliary frame 15 serves, in a manner known per se, for accommodating or receiving thereon the right and left wheel suspensions 16 and 17 and the wheel spring system (not shown), all of which may be of any suitable known construction. For example, two superimposed guide arms and coil springs may be used for the wheel suspensions of the front wheel. The axis extending through the two bearing supports 13 and 14, i.e., the straight line connecting the same, is designated by reference numeral 20 in both FIGURES 1 and 2.

At a distance $a$ below the axis 20 are disposed the two pivotal connections 22 and 23 for two support members 24 and 25 which brace or support the auxiliary frame 15 against the main frame 11, 12 through pivotal connections 26 and 27 which are disposed within the area of the upwardly bent portions 11' and 12' of the longitudinal side bearer members 11 and 12. The arrangement of the two special support members 24 and 25 is thereby so made that the connecting lines 28 and 29 between the intersection 30 of the longitudinal axes thereof and the two axle spindle bolts 21 and 31 extend parallel to the outer portion of the tie rods 32 and 33.

While I have shown and described a preferred embodiment in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:

1. A front wheel suspension for a motor vehicle having a vehicle superstructure, comprising an auxiliary frame, independent wheel suspension means supported on said auxiliary frame, elastic means for elastically supporting said vehicle superstructure on said auxiliary frame in only one place on each side of the central longitudinal plane of the vehicle, and resilient stabilizing support means for stabilizingly securing said auxiliary frame at said vehicle superstructure including two thrust members forming essentially two sides of a triangle and each flexibly connected at one end thereof to said auxiliary frame and at the other end thereof to said vehicle superstructure, said thrust members extending substantially in a plane spaced a vertical distance from the line connecting said two places of said first-mentioned elastic means to effectively constitute thereby a lever arm, one of the two ends of each of said thrust members being operatively connected with the center region of said auxiliary frame while the two other ends are disposed laterally outwardly thereof and are displaced in the longitudinal direction of the vehicle where they are connected with said vehicle superstructure.

2. A front wheel suspension for a motor vehicle having a vehicle superstructure, comprising auxiliary frame means including suspension means, elastic means for elastically supporting said vehicle superstructure on said auxiliary frame in only one place on each side of the central longitudinal plane of the vehicle, and auxiliary support means for additionally supporting said auxiliary frame at said vehicle superstructure including two thrust members forming essentially two sides of a triangle and each flexibly connected at one end thereof to said auxiliary frame means and at the other end thereof to said vehicle superstructure, said thrust members having a longitudinal axis each intersecting in one point, steering means including outer tie-rods, said point being disposed below and toward the rear of the line interconnecting said two places of the elastic support of said vehicle superstructure on said auxiliary frame, the connecting line between said point and the axle spindles extending parallel to said outer tie-rods, said thrust members extending substantially in a plane at a vertical distance from said line connecting said two places of the first-mentioned elastic support means to effectively constitute thereby a lever arm, one of the two ends of each of said thrust members being operatively connected with the center region of said auxiliary frame means while the two other ends are disposed laterally outwardly thereof and are displaced the longitudinal direction of the vehicle where they are connected with said vehicle superstructure.

3. A front wheel suspension according to claim 2, wherein said one end of each of said two thrust members is the front end thereof and wherein the other end is the rear end thereof.

4. A front wheel suspension according to claim 2, wherein said vehicle superstructure includes longitudinal side bearer members provided with upwardly disposed off-set portions, and wherein said thrust members are operatively connected in a pivotal manner with said longitudinal side bearer members within the area of said off-set portions.

5. A front wheel suspension for a motor vehicle having a vehicle superstructure, comprising auxiliary frame means including suspension means, elastic means for elastically supporting said vehicle superstructure on said auxiliary frame in only one place on each side of the central longitudinal plane of the vehicle, and auxiliary support means for additionally supporting said auxiliary frame at said vehicle superstructure including two thrust members forming essentially two sides of a triangle, said thrust members having a longitudinal axis each intersecting in one point, said thrust members each being flexibly connected at one end thereof to said auxiliary frame means and at the other end thereof to said vehicle superstructure, said thrust members extending substantially in a plane vertically spaced from the straight line connecting said two support places of said elastic support means to effectively constitute thereby a lever arm, said point being disposed below and to the rear of said straight line, the front ends of each of said thrust members being operatively connected within the center region of said auxiliary frame means while the rear ends thereof are disposed laterally outwardly thereof and are displaced in the longitudinal direction of the vehicle where they are connected with said vehicle superstructure.

6. A front wheel suspension for motor vehicles having a vehicle superstructure including longitudinal side bearer members, comprising an auxiliary frame, independent wheel suspension means supported on said auxiliary frame, elastic means for elastically supporting said vehicle superstructure on said auxiliary frame in only one place on each side of the central longitudinal plane of the vehicle, and resilient stabilizing support means for stabilizingly securing said auxiliary frame at said vehicle superstructure including bracing means forming arms extending in the direction of two sides of a triangle and arranged in an essentially horizontal plane extending longitudinally of the vehicle, said plane being vertically displaced from the straight line connecting said two places of the elastic support means, each of said arms being flexibly secured at one end thereof to said auxiliary frame within the center region thereof and extending diagonally outwardly therefrom and being flexibly secured at the other end thereof to the longitudinal side bearer members of the vehicle superstructure.

7. A front wheel suspension according to claim 6, wherein the means for flexibly securing each of said arms to the auxiliary frame and to the longitudinal side bearer members of the vehicle superstructure includes elastic bearing means for elastically connecting both ends of each of said arms to the respective longitudinal side bearer members and to the auxiliary frame.

8. A front wheel suspension for a motor vehicle having a vehicle superstructure and a main frame for supporting the same, comprising an auxiliary frame, independent wheel suspension means supported on said auxiliary frame, elastic means for elastically supporting said main frame on said auxiliary frame in only one place on each side of the central longitudinal plane of the vehicle, and auxiliary bracing means for stabilizingly securing said auxiliary frame to said main frame, said bracing means including two rigid auxiliary supporting arm portions effectively forming thrust members and coinciding essentially with two sides of a triangle, means for pivotally connecting one end of each of said arm portions to said auxiliary frame and the other end of each of said arm portions to said main frame, said bracing means extending substantially in an essentially horizontal plane spaced at a vertical distance below the straight line connecting said two places of said first-mentioned elastic means to effectively constitute thereby a lever arm, each of said one ends of the two arm portions being located near the central longitudinal vertical plane of the vehicle while each of said other ends thereof is disposed laterally outwardly therefrom and is displaced in the longitudinal direction of the vehicle with respect to a respective said one end.

References Cited in the file of this patent

UNITED STATES PATENTS

| | | |
|---|---|---|
| 1,778,633 | Ford | Oct. 14, 1930 |
| 2,746,766 | Nallinger | May 22, 1956 |
| 2,751,992 | Nallinger | June 26, 1956 |
| 2,755,100 | Giacosa | July 17, 1956 |

FOREIGN PATENTS

| | | |
|---|---|---|
| 212,143 | Australia | Jan. 16, 1958 |